US009172685B2

(12) United States Patent
Johnson et al.

(10) Patent No.: US 9,172,685 B2
(45) Date of Patent: Oct. 27, 2015

(54) SYSTEM AND METHOD FOR PROVIDING A SECURE BOOK DEVICE USING CRYPTOGRAPHICALLY SECURE COMMUNICATIONS ACROSS SECURE NETWORKS

(71) Applicant: Unisys Corporation, Blue Bell, PA (US)

(72) Inventors: Robert A. Johnson, Pottstown, PA (US); Thomas Douris, Norristown, PA (US); Anh Duong, Exton, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/832,326

(22) Filed: Mar. 15, 2013

(65) Prior Publication Data

US 2014/0282892 A1    Sep. 18, 2014

Related U.S. Application Data

(63) Continuation of application No. 11/339,974, filed on Jan. 26, 2006, now abandoned.

(60) Provisional application No. 60/648,531, filed on Jan. 31, 2005.

(51) Int. Cl.
*G06F 7/04* (2006.01)
*G06F 15/16* (2006.01)
*G06F 17/30* (2006.01)
*H04L 29/06* (2006.01)

(52) U.S. Cl.
CPC ........ *H04L 63/0471* (2013.01); *H04L 63/0281* (2013.01); *H04L 63/0209* (2013.01); *H04L 63/0227* (2013.01)

(58) Field of Classification Search
CPC ........ H04L 63/08; H04L 9/08; H04L 2209/24
USPC ............................................................ 726/4
See application file for complete search history.

(56) References Cited

U.S. PATENT DOCUMENTS 5,623,549 A * 4/1997 Ritter .............................. 380/37
8,769,699 B2 * 7/2014 Orsini et al. .................... 726/26

OTHER PUBLICATIONS

Matin Bagherpour; Enhancing Data Transmission Reliability with Multipath Multicast Rate Allocation; p. 1-10; vol. 2, No. 3, Sep. 2011.*

* cited by examiner

*Primary Examiner* — Monjour Rahim
(74) *Attorney, Agent, or Firm* — Richard J. Gregson

(57) ABSTRACT

A system for integrating access to separate and physically partitioned networks from a single client device is described. The system is interposed between the client device and the networks to allow communication between the client device and the networks, such that data remains partitioned between networks. The system includes a scrambler configured to mix portions of data of variable bit lengths. Typically, the scrambler receives the portions of data from each of the plurality of networks, intermixes the portions of data from the networks, then selects different paths for transporting the intermixed portions of data to the client device. Each of the different paths for transporting the intermixed portions of data are physically and/or logically partitioned from each other. Only when the data arrives on the client device is it able to be reassembled, and then only in particular partitioned locations on the client device corresponding to the particular network from which the data originated.

19 Claims, 5 Drawing Sheets

SYSTEM AND METHOD FOR PROVIDING A SECURE BOOK DEVICE USING CRYPTOGRAPHICALLY SECURE COMMUNICATIONS ACROSS SECURE NETWORKS

CROSS-REFERENCE TO RELATED APPLICATIONS

The present patent application claims benefit of U.S. Provisional Application Ser. No. 60/648,531 filed on Jan. 31, 2005. The content of the aforementioned application is fully incorporated by reference herein.

TECHNICAL FIELD

The present invention relates generally to computer network security, and more specifically, to a system for integrating communication between separate networks having different security levels while maintaining a partition between networks.

BACKGROUND

The United States Department of Defense currently uses three separate networks to communicate information between users: (1) JWICS (Joint Worldwide Intelligence Communications Systems); (2) SIPRNet (Secret Internet Protocol Router Network); and (3) NIPRNet (the Non-secure Internet Protocol Router Network). Each of these networks are used to transmit different types of information based the level of security associated with the content of the information. That is, information that is deemed "top secret" may only be communicated or exist on the JWICS network, Information that is deemed "classified," up to and including information deemed secret, may only be communicated or exist on the SIPRNet. Finally, information that is deemed unclassified may only be present on the NIPRNet. Additionally, access to the public Internet may only be obtained through the NIPRNet.

As separate and independent networks JWICS. NIPRNet, and SIPRNet operate in parallel. There is no inter-access between networks. Intermingling of data between networks is deemed a catastrophic security risk, as there is a potential to gain access to either the top secret or classified information from a lower-level network or even the Internet, if the networks were physically interconnected. Accordingly, each network includes its own set of storage, routers, and end-user computer platforms operating in parallel.

One major downside with having three separate and parallel networks are the increased costs associated with thrice duplicating the overhead of three parallel systems. Accordingly, the U.S. Department of Defense spends a substantial amount of money to design, deploy, manage and maintain a parallel network infrastructure. The three separate networks are designed to maximize security by reducing vulnerabilities associated with there being potential access to a high-security-level network from one or more lower-security-level networks deemed or public networks (e.g., the Internet).

Furthermore, having three sets of independent networks presents logistical problems and inconveniences. For example, in order for the end-user to communicate with each network simultaneously, the end-user may have to use more than one computer platform. For example, an individual with a "top secret" security level clearance typically has three separate computers operating on their desk to communicate on each network. To accomplish tasks, it is often necessary for higher-clearance personnel to constantly switch back and forth between multiple computer platforms. This need to switch between computer platforms and networks according to security level is time consuming, tedious, and unproductive.

Furthermore, when high-clearance personnel deploy in a combat zone, such personnel have the burden of accessing three separate networks through multiple computer platforms, which must be transported to the combat zone. In a combat environment, this requirement presents a logistical burden, requiring the transportation of redundant sets of hardware to a site, along with additional personnel to handle the demand of administering and often deploying triplicate sets of equipment.

SUMMARY

A system for integrating access to physically partitioned separate networks from a single client device is described. The system is interposed between the client device and the networks to allow communication between the client device and the networks, such that data remains partitioned between networks.

In an illustrative embodiment, the system includes a scrambler configured to intermix portions of data sent from each of the plurality of networks to the client device. The scrambler then selects different paths for transporting the intermixed portions of data to the client device. Each of the different paths for transporting the intermixed portions of data are physically and/or logically partitioned from each other. Only when the data arrives on the client device is it able to be reassembled, and then only in particular partitioned locations on the client device corresponding to the particular network from which the data was sent. From the end-user's perspective authorized assets accessible on any one of the plurality of networks appear accessible from a single network connection on a single client device.

Splitting-up data into various bit portions, mixing such data, and then transporting the mixed portions of data over multiple paths, reduces the amount of usable data that can be obtained from anyone client device, in the event there is an unauthorized connection to the system. That is, as data travels from any one of the partitioned networks it is divided into data portions (any bit or collection of bits in length), mixed with other portions of data from different networks and transported over different traffic paths. Thus, to view recognizable data in the system requires viewing all the data portions across the entire system. Various encryption techniques and keys may also be used in conjunction with innovative systems and methods described herein to increase security.

An advantage of the present invention is the convenience of accessing three physically partitioned networks from a single client device.

Another advantage of the present invention is the ability to only deploy a single computer platform at a remote military base, which reduces logistical burdens associated with transportation of redundant sets of hardware to a site, along with additional personnel to handle the demand of administering and often deploying such redundant equipment.

Still another advantage of the present invention is a reduction in costs in the amount of duplication and overhead associated with maintaining separate networks only accessible through a corresponding separate end-user computing device.

Various other features and advantages shall become more apparent from the following description.

BRIEF DESCRIPTION OF THE DRAWINGS

The detailed description is explained with reference to the accompanying figures. In the figures, the left-most digit(s) of a reference number identifies the figure in which the reference number first appears.

DETAILED DESCRIPTION

Environment

A system for, and method of integrating access to physically partitioned separate networks from a single client device is described herein. The system is interposed between the client device and the networks to allow communication between the client device and the networks, such that data remains partitioned between networks. This Detailed Description assumes the reader is familiar with the currently used U.S. Department of Defense multilevel security network architectures, including the basics for maintaining and accessing data on each of the networks referred to as the JWICS (Joint Worldwide Intelligence Communications Systems), SIPRNet (Secret Internet Protocol Router Network), and NIPRNet (the Non-secure Internet Protocol Router Network).

Although embodiments described herein will generally refer to these multi-level security network systems, it is appreciated by those skilled in the art having the benefit of this disclosure that the innovative techniques herein are not limited to U.S. Department of Defense networks, and may be applied to other networks having different security levels for accessing and maintaining data.

Reference herein to "one embodiment", "an embodiment", or similar formulations herein, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Figure 1:
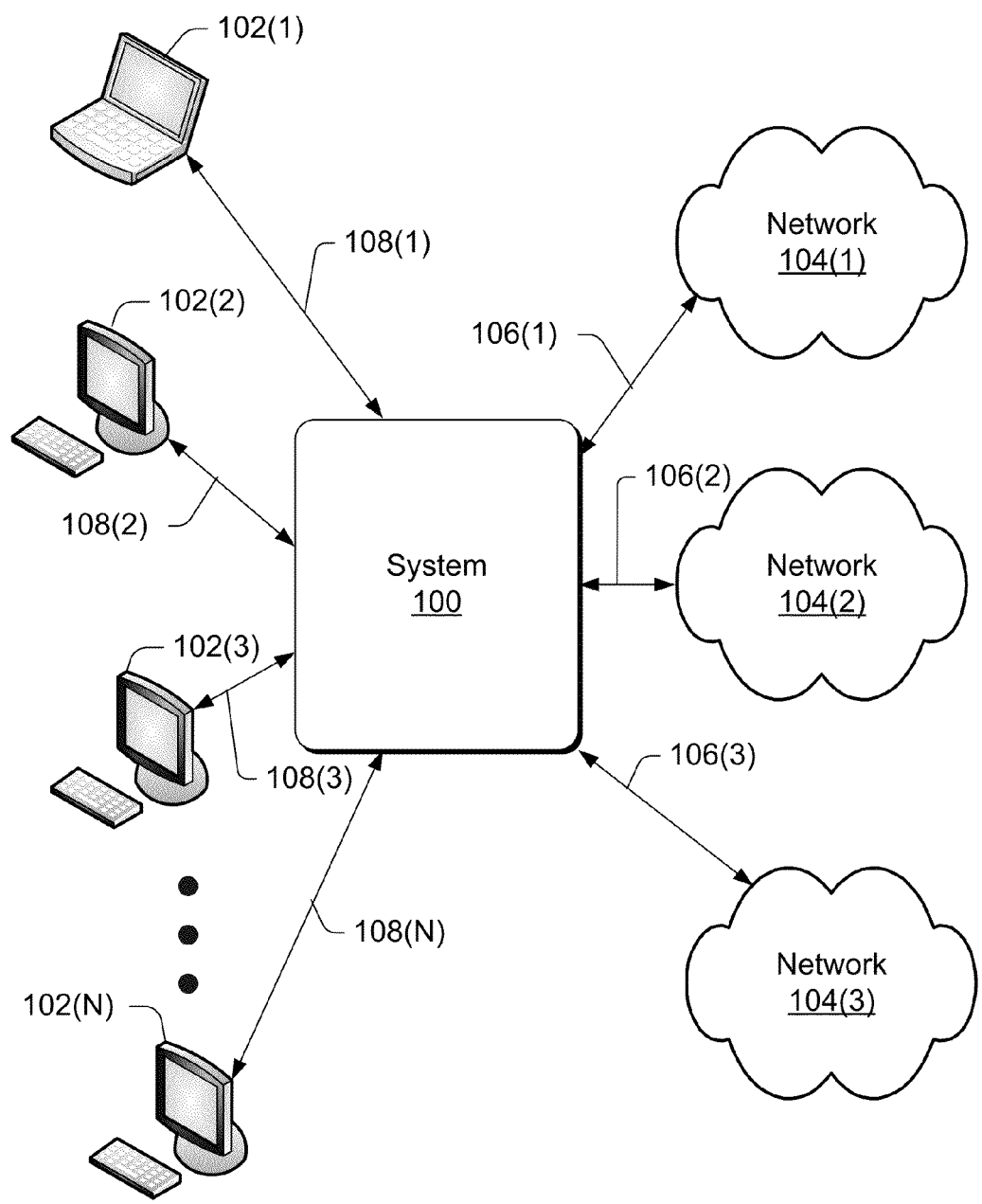
FIG. 1 is a system 100 interposed between client devices and a plurality of separate networks, each of the networks physically partitioned from each other for security purposes.

Referring initially to FIG. 1 is a system 100 interposed between client devices 102(1), 102(2), 102(3), . . . , 102(N), and a plurality of separate networks 104(1), 104(2), and 104(3) each physically partitioned from each other for security purposes. In other words, there is no inter-access from one network to the other, and there is a requirement that data between networks be partitioned from each other. In one embodiment, network 104(1) is the JWICS network, network 104(2) is the SIPRNet, and network 104(3) is the NIPRNet. It is possible that more or less than three networks could be connected to system 100.

Each network, referred to generally as reference number 104 is connected to system 100 through its own point-to-point connection 106(1), 106(2), and 106(3). Additionally, each client device, referred to generally as reference number 102, is connected to system 100 through its own point-to-point connection 108(1), 108(2), . . . , 108(N). Any number of communication protocols may be used to communicate between networks 104 and system 100 as well as between system 100 and client device 102. For example, a combination of standard protocols such as HyperText Transport Protocol over Secure Sockets Layer (HTTPS) and lower-level (network layer and below) packet encryption, such as FP-Sec tunneling may be used to communicate between system 100 and networks 104. The same is true for communication between client devices 102 and system 100 over point-to-point connections 108.

Client devices 102 may be implemented as any general purpose or special purpose computing system, such as a workstation computer, a personal computer, a portable computer, and various other computer platforms typically used by an end-user to communicate with a web-service or database resident on a network.

An end-user operating a client device 102 is generally assigned one of three levels of security clearance to access one or more of the networks 104. For example, an end-user having a top-secret security clearance level may access any of the networks via, the same client device 102 simultaneously. Unlike technology commonly in use today as described in the background section, an end-user using the innovative system 100 described herein may access all three networks simultaneously using only a single client device 102. Typical login safeguards, passwords, keys, security devices, and other security features are necessary for an end-user to authenticate himself/herself prior to gaining access possibly to either the client device 102 and/or the networks 104. Additionally, any number of encryption techniques can be used in conjunction with system 100.

Having introduced the general environment, client devices 102 and networks 104, it is now possible to focus the discussion on system 100.

System

System 100 is interposed between client devices 102 and networks 104. It allows an end user to communicate in an integrated fashion with networks 104 on a single client device 102. System 104 also ensures that there is a physical and/or logical data partition between networks and no inter-access of data between networks from any client device 102.

Figure 2A:
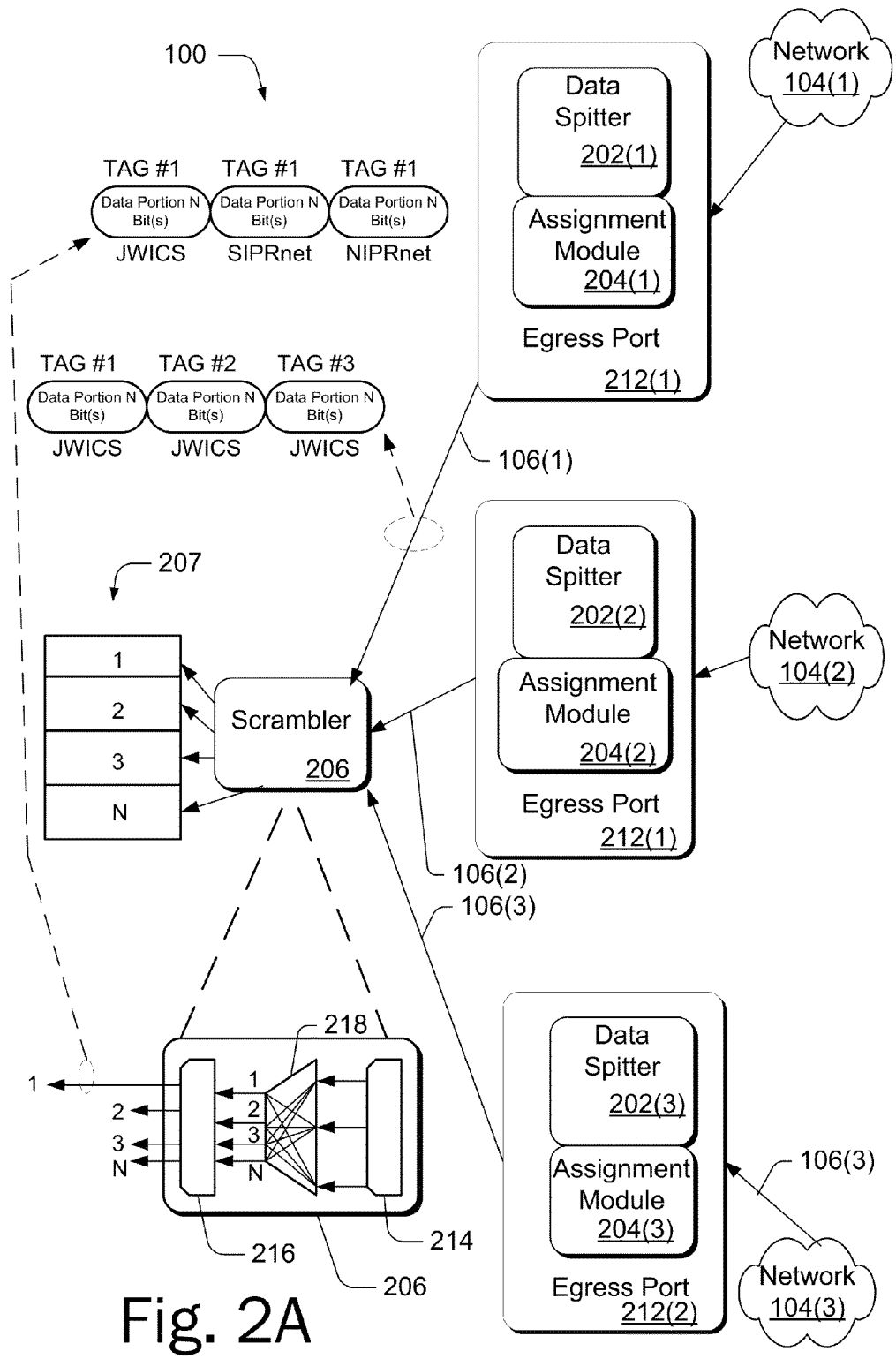
FIGS. 2A and 2B are an exemplary diagram of system 100.

FIG. 2A shows a first portion of an exemplary diagram of system 100, according to one embodiment of the present invention. In particular FIG. 2A shows a portion of system 100 that is responsible for intermixing, data received from networks 104 as well as selecting data paths for each portion of data to follow. Referring to FIG. 2A, system 100 includes a network-side data splitter 202, a network-side assignment module 204, a scrambler 206, and a buffer system 207.

Portions of system 100 may reside on separate computer platforms (such as exemplary platform 400 shown in FIG. 4) and/or in the form of modules (hardware, firmware, logic, software and other functional mediums) operating on a computer platform. Additionally, portions of system 100 may include physical and/or logical data paths.

Egress ports 212(1), 212(2), and 212(3) are located at each network 104. Also resident at the egress ports 212 is data splitter 202 and assignment module 204. Data splitter 202 divides data into portions of data. A portion of data is any bit or combination of bits of data that comprise a larger set of data. A portion of data may be encapsulated in packets for transport, but the content of the data may be fixed or of a variable bit length. Accordingly, a portion of data corresponds to one or more bits comprising data content, i.e., payload as opposed to a data header message. Data splitter 202 may be configured to produce predetermined bit length portions of data or it may be determined dynamically in an automatic fashion.

Assignment module 204 assigns tags to each portion of data. Each tag contains metadata indicating a traffic path (to be described) a particular portion of data is to be distributed through from networks 104 to a client device 102 (FIG. 1) via system 100. Other metadata may be included in the tags, such as information identifying the network the portion of data originated, the client device destination, possibly the order of the portion of data in relation to other portions of data emitted from the same network, and other suitable information.

Although shown as residing at the egress points 212, data splitter 202 and assignment module 204 may physically reside along point-to-point connections 106 or at an ingress port (to be described) for system 100.

Scrambler 206 is connected to networks 104 via point-to-point connections 106. Scrambler 206 includes a plurality of ingress ports 214 each configured to receive portions of data from a corresponding network. Scrambler 206 also includes a plurality of egress ports 216(1), 216(2), . . . , 216(N) each configured to transmit the portions of data to a location, such as a client device 102 or storage device (not shown), via a plurality of traffic paths 1, 2, 3, . . . , N.

Scrambler 206 includes a cross-bar 218 that selects which egress port 216 to send portions of data. For example, a portion of data that enters ingress port 214(1) having a tag of 1 (or other indicia) is sent to egress port 216(1). Likewise a portion of data having a tag of 1 that enters egress port 214 from network 104(2) is sent to egress port 216/path 1 by cross-bar 218. Portions of data with tags of 2 from any network are all sent by cross-bar 218 to egress port 216(2). Likewise portions of data with tags of 3 received from each network are sent by cross-bar 216 to egress port 216(3), and so forth through N.

Cross-bar 218 may be implemented as physical point-to-point switch or may also be implemented logically as a soft-switch, or as a combination of software and/or hardware (such as a server). Accordingly, any suitable module may be substituted for cross-bar 218 that performs an equivalent function of directing portions of data from an ingress point to an egress based on metadata associated with a tag value assigned to the portion of data.

Portions of data from each network are sent to different egress ports for transportation via a particular data path (1, 2, 3, . . . , N) to a particular destination, such as a client device, based on tag values assigned to the portion of data. Thus, scrambler 206 facilitates the intermixing of portions of data from each of the plurality of networks 104. That is, portions of data received from each network are mixed-up by scrambler 206 based on tags (not the level of security associated with the portion data), and then travel on different data paths to a targeted endpoint. Because portions of data (bits of data) are all intermixed in a nonsensical manner at any one point beyond scrambler 206, it is not possible break-in to the system to reconstruct the data without the ability to view all data in the entire system 100 at one time.

Figure 2B:
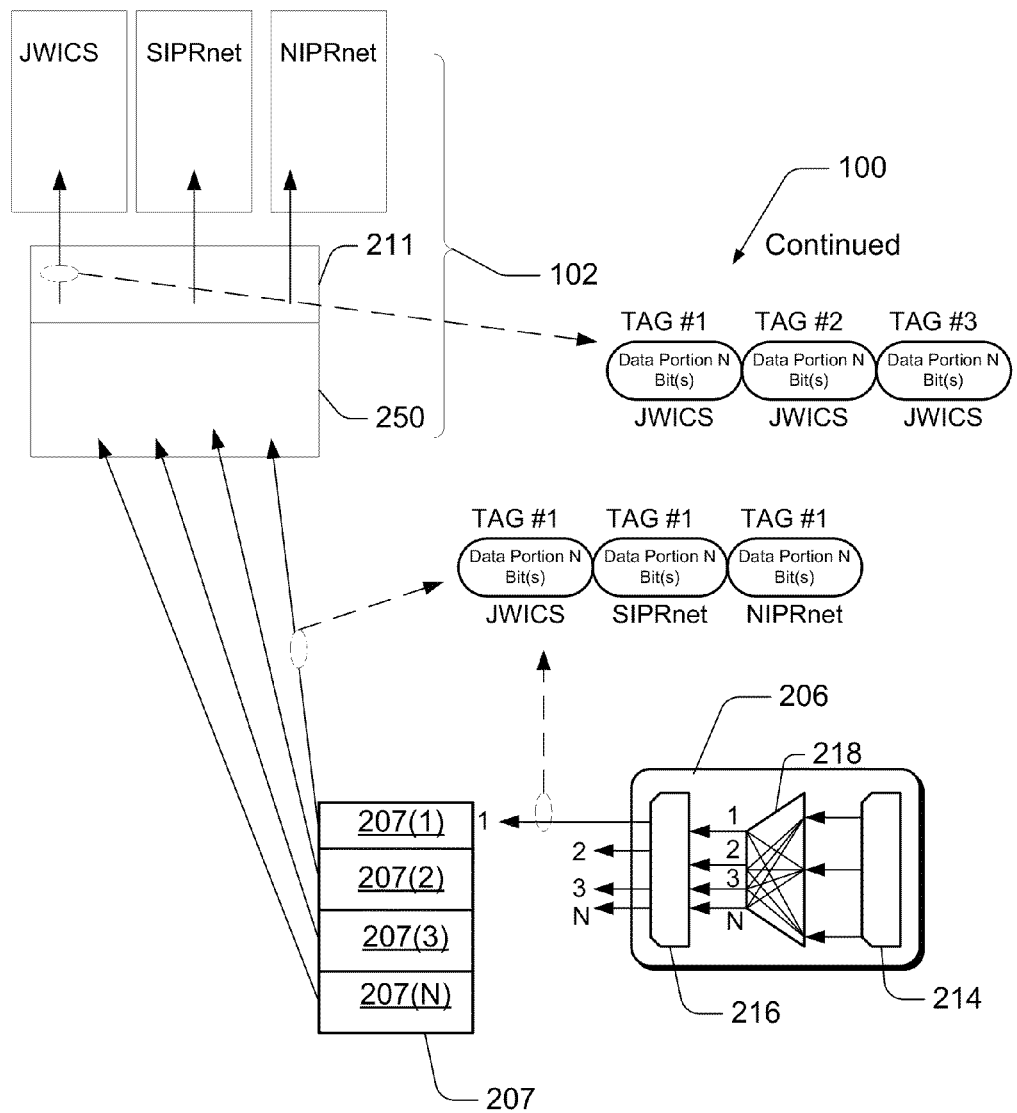

Referring now to FIG. 2B, connected to egress port 216 is a buffer system 207 including buffers 207(1), 207(2), 207(3), . . . , 207(N) each forming one or more portions of data path for data to traverse. That is, each buffer corresponds to a different data path for transporting the intermixed portions of data to client devices 102. For example, a data portion with an assigned tag value of 1, is sent from egress port 216 to buffer 207(1). A data portion with an assigned tag value of 2 is transported from egress port 216 to buffer 207(2), and so forth through N. Each buffer 207 allows data to be temporarily stored prior to be sent to another destination, such as one or more of the client devices 102. Each buffer may have access to ports, cross-bars and/or switches, servers, etc. (not shown) to select a data path for sending portions of data to a client device 102 or other intermediary points.

Additionally, buffer system 207 is a part of the data paths for sending portions of data to client devices 102 from networks 104. Each of the buffers forming buffer system 207 may be physically distributed on different server devices, and hence are partitioned, or may be logically partitioned as part of a single computer system, such as a server.

Once a portion of data exits buffer system 207, it is sent to a client device 102 (directly or indirectly). Typically, a collection of portions of data from each of the buffers is sent to a client device 102 for reassembly by a client device 102 according to the security clearance level of the end-user.

There may be a partitioned buffer 250 in each client device 102 for receiving the intermixed portions of data. Without proper keys and other security login measures, it is not possible to reassemble the scrambled data at this point.

An assembler module 211 operating on a client device 102 is configured to reassemble portions of data received via the different data paths. Usually different memory partitions on the client device 102 are used to reassemble the data (e.g. join each of the portions of data together in proper order). Metadata associated with each portion of data is used to determine to which level of security the portion of data belongs. For example, data sent from network 104(1) is only sent to a partition associated with a level of security associated with that particular network, such as "top secret." Accordingly, each partition of memory corresponds to a different level of security of a particular network.

Once reassembled on the client device 102, authorized assets appear accessible from a single network connection from the end-user's perspective. It is noted that various security techniques may be employed on client device 102 to prevent the user from saving data, mixing different levels of data, or sending the data to other locations for dissemination to another network, such as via e-mail or other electronic transfer means. Applications may also execute on separate physical and/or logical partitions within a client device 102.

Data exiting a client device destined for anyone of the networks may be sent back to a particular network via system 100 using the same functional blocks, but in reverse order. For instance, a client-data splitter (not shown) operating on client device 102 may split-up data into data portions, similar to the way in which the data is split-up on the network side. Once portions of data are generated, each portion of data may be assigned a tag by client-side assignment module (not shown), which is used to direct the portion of data to an appropriate data path via buffer system 207. Generally, each portion of data arrives back to a re-assembler (not shown) and is sent back to an appropriate network via a point-to-point connection 106. In other words, the re-assembler may include one or more assembler modules 211, such as shown in client device 102 (FIG. 2). Such assembler module(s) may be integrated within scrambler 206. Alternatively, such assembler modules may be integrated as part of one or more functional blocks (not shown) on data paths which flow toward networks 104 (FIG. 2), such as between buffer system 207 and point-to-point connections 106.

It is noted that system 100 may include several interconnected server and/or computer devices which fulfill the functionality provided by each of the devices and modules shown in FIG. 2 as part of system 100. For example, it is possible for all the partitions, including mixing and routing of data through different data paths to be implemented logically on a single mainframe computer or server. It is also possible to implement each feature on multiple distributed devices connected together as an intranet.

Exemplary Methods of Operation

Figure 3:
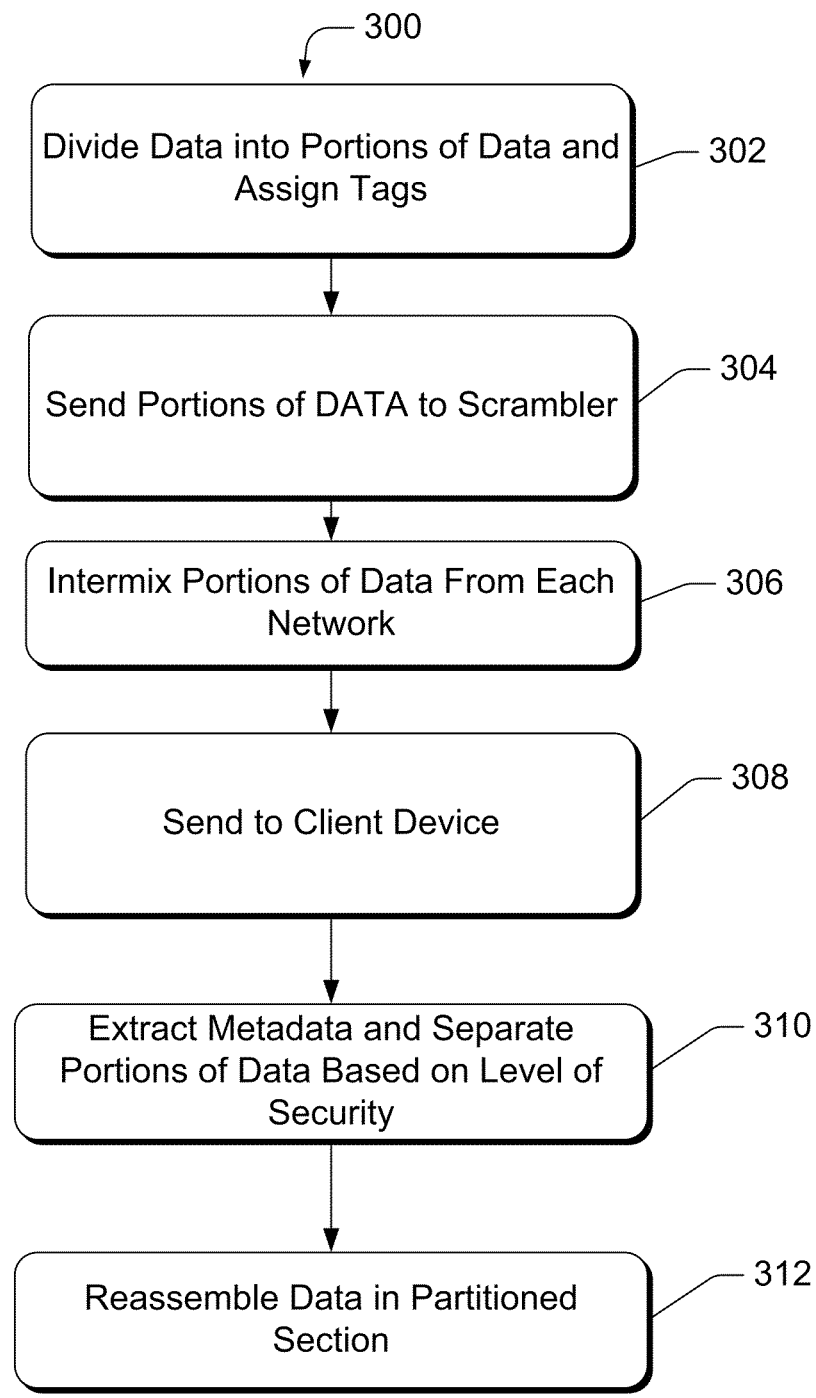
FIG. 3 illustrates an exemplary method 300 for securely transmitting data from separate networks operating in parallel to one or more end-users.

FIG. 3 illustrates an exemplary method 300 for securely transmitting data from separate networks operating in parallel to one or more end-users. Method 300 includes blocks 302, 304, 306, 308, 310, and 312 (each of the blocks represents one or more operational acts). The order in which the method is described is not to be construed as a limitation, and any number of the described method blocks can be combined in any order to implement the method. Furthermore, the method can be implemented in any suitable hardware, software, firmware, or combination thereof.

In block 302, data is divided into portions of data and tag values are assigned to the portions of data. For example, in one embodiment, assignment module 204 (FIG. 2) assigns tags to each portion of data at each network. Each tag contains metadata indicating a traffic path a particular portion of data is to be distributed through system 100 (FIGS. 1 and 2) from networks 104 to client device 102. The metadata may identify the network from which the portion of data originated as well as the end-point the portion of data is destined.

In block 304 the portions of data are transmitted from an egress point at each of the separate networks to a common node. For example, portions of data are transmitted from a port on a network via a point-to-point connection to a scrambler 206 (FIG. 2).

In block 306, the data is intermixed by distributing each portion of data to a buffer (and/or a particular data path) based on a tag assigned to the data. For example, scrambler 206 (FIG. 2) sends data to a particular data path based on the tag value. Portions of data with like tag values are routed to the data path corresponding to a particular data value, regardless of the network from which the portions of data emanated.

In block 308, portions of data are sent to queues (e.g., buffers) at an ingress point of an end-user device, each queue corresponding to one of the tags.

In block 310, portions of data from each queue are extracted and assigned to a logical partition corresponding with a level of security associated with a particular one of the networks based on the metadata identifying the network from which the portion of data originated.

In block 312, each portion of data is then reassembled for use on the end-user device. For example, a re-assembler module 211 (FIG. 2) extracts metadata from each portion of data and reorders the data in a continuous fashion for use by an application executing on the client device.

Exemplary System Platform

Any functionality provided by system 100, client devices 102, and/or portions of functionality performed at an egress port of a network and the methods 300 (FIG. 3) can be implemented in any general purpose or special purpose computing system. Examples of well known computing systems, environments, and/or configurations that may be suitable for use to perform these various functions include, but are not limited to, personal computers, server computers, multiprocessor systems, microprocessor-based systems, network computers, routers, minicomputers, mainframe computers, distributed computing environments or devices that include any of the above systems or devices, and the like.

Additionally, any exemplary functionality provided by a module or function block (in either FIG. 2 or FIG. 3) may be described in the general context of computer-executable instructions, such as program modules, being executed by a computer. Generally, program modules include routines, programs, objects, components, data structures, logic, and other executable data that perform particular tasks or implement particular abstract data types. Program modules may be located in local, remote, and/or distributed computer storage media including memory storage devices.

Figure 4:
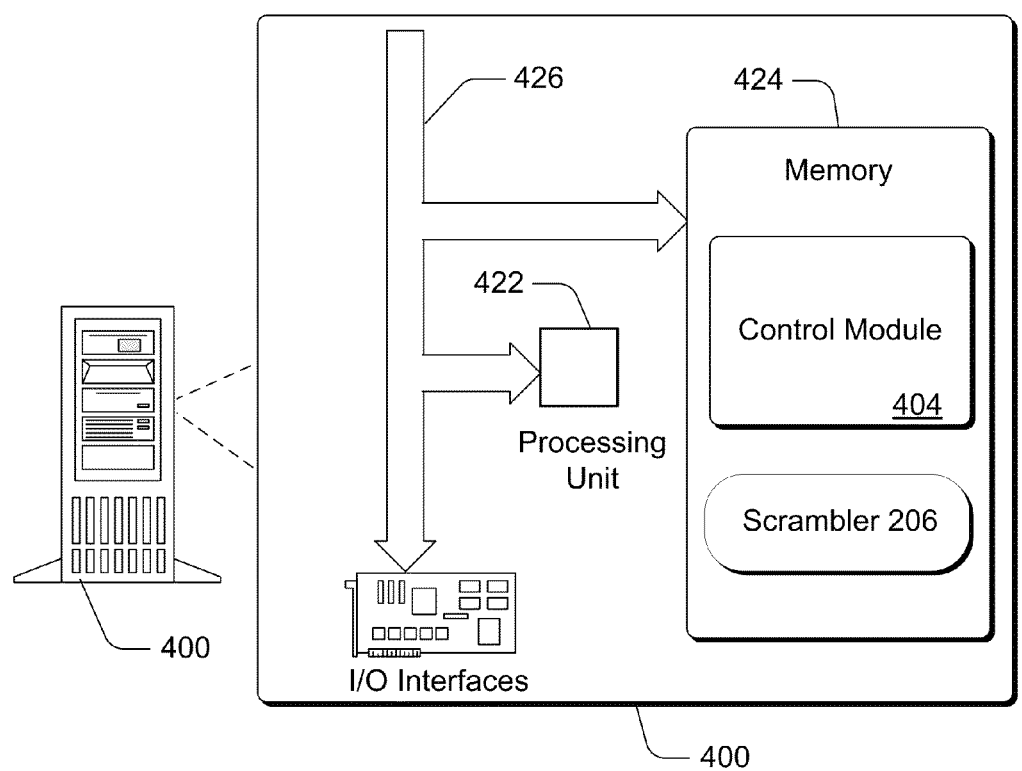
FIG. 4 illustrates an exemplary physical representation of a computer platform used to implement functionality performed by a system 100 (and/or its constituent elements).

FIG. 4 illustrates an exemplary physical representation of a computer platform 400 used to implement functionality performed by system 100 (FIGS. 1, 2 and 3). In particular, computer platform 300 represents any general purpose or special purpose computing system (or systems) with modifications to hardware, firmware, and/or software. Computer platform 500 is only one example of computer platform and is not intended to suggest any limitation as to the scope of use or functionality of any system or method described herein. Neither should the computer platform 400 be interpreted as having any dependency or requirement relating to any one or combination of components described herein.

Computer platform 400 includes a control module 404, which controls the operation of platform 400, Control module 404 can be implemented in hardware, firmware, logic, software, or any combination of thereof. In the illustrative exemplary implementation control module 404 is implemented as a program module that may be described in the general context of computer-executable instructions, being executed by a computer, i.e., one or more processors in a processing unit 422. Control module 404 resides in memory 424.

Memory 424 typically includes a variety of computer readable media. Such media can be any available media that is accessible by computer platform 400 and includes both volatile and non-volatile media, removable and non-removable media. The computer-readable media provide non-volatile storage of computer readable instructions, data structures, program modules, and other data for computer platform 400. Any number of program modules can be stored in the computer readable media of memory 424, including one or more portions of control module 404.

It is also noted that portions of control module 404 may be stored in a remote memory storage device remote from computer platform 400. Additionally, even though control module 404 is illustrated herein as a discrete block, it is recognized that any of these components may reside at various times in different storage components of computer platform 400 and are executed by one or more processors of a computer, such as processing units 422.

Various functionality performed by system 100 are typically stored in control module 404 of the computer platform 400. For example, in one implementation, scrambler 206 represents computer-executable instructions executed by a processing unit 422 of a computer, but could also be implemented in hardware or any combination of hardware, firmware, logic, and software.

Although scrambler 206 is shown as a single block, it is understood that when actually implemented in the form of computer-executable instructions, logic, firmware, and/or hardware, that the functionality described with reference to it may not exist as separate identifiable block. Additionally, scrambler 206 as well as the other various modules and elements comprising system 100 may also be integrated with other components or as a module in a larger system.

The embodiments described herein are to be considered in all respects only as exemplary and not restrictive. The scope of the invention is, therefore, indicated by the subjoined Claims rather by the foregoing description. All changes which come within the meaning and range of equivalency of the Claims are to be embraced within their scope.

The invention claimed is:

1. A secure communication system interposed between a client device and a plurality of separate networks each physically partitioned from each other for security purposes, the client device operated by an end-user having a particular security clearance level for accessing one or more of the separate networks via the client device, the system comprising:
   a data splitter, configured to divide data into a portion of data which is Y bits in length, Y numbering at least one, wherein a portion of data is associated with data content;
   an assignment module executing within the secure communications system, configured to assign tags to each portion of data, each tag containing metadata indicating a traffic path a particular portion of data is to be distributed through and the network from which the portion of data originated as well as the end-point the portion of data is destined;
   a scrambler connected to the plurality of networks, configured to intermix portions of data sent from each of the plurality of networks and to select different paths for transporting the intermixed portions of data to the client device based on the tags assigned to the portions of data, each of the different paths being physically and/or logically partitioned from each other; and
   a buffer system configured to send the intermixed portions of data to the client device for reassembly by the client device according to the security clearance level of the end-user, whereby from the end-user's perspective authorized assets appear accessible from a single network connection;
   wherein the client device is coupled to the secure communications system for transmitting over the plurality of separate networks;
   the secure communications system coupled to the plurality of separate networks for transmitting data sent and received from the client device over the plurality of separate networks.

2. The secure communication system of claim 1, wherein the assignment module is located at an egress point of each network.

3. The secure communication system of claim 1, wherein a portion of data is encapsulated in a packet for transportation from a network to the client device.

4. The secure communication system of claim 1, wherein a portion of data is at least one of a fixed bit length and a variable bit length.

5. A secure communication system for distributing portions of data received from a plurality of separate networks each associated with a different security level to an attached client device, comprising:
   an assignment module configured to assign tags to a portion of data, each tag containing metadata indicating a data path by which a particular portion of data is to be distributed through and the network from which the portion of data originated as well as the end-point the portion of data is destined;
   a plurality of ingress ports each configured to receive the portions of data from a corresponding network;
   a plurality of egress ports each configured to transmit the portions of data to a location via a plurality of traffic paths; and
   a scrambler interposed between the plurality of ingress ports and egress ports, configured to distribute the portions of data received from each ingress port to egress ports based on the tags associated with each portion of data;
   wherein the client device is coupled to the secure communications system for transmitting over the plurality of separate networks;
   the secure communications system coupled to the plurality of separate networks for transmitting data sent and received from the client device over the plurality of separate networks;
   each of the plurality of networks being physically partitioned from each other for security purposes;
   the client device operated by an end-user having a particular security clearance level for accessing one or more of the separate networks via the client device; and
   the client device maintains complete isolation of data when communicating between the client workstation and the separate networks.

6. The secure communication system of claim 5, further comprising a data splitter, configured to divide data into a portion of data which is Y bits in length, Y numbering at least one, wherein a portion of data is associated with data content.

7. The secure communication system of claim 5, wherein the assignment module is located at an egress point of each network.

8. The secure communication system of claim 5, further comprising at least one buffer connected to a particular one of the egress ports, configured to buffer portions of data transmitted from the particular one of the egress ports.

9. The secure communication system of claim 5, further comprising at least one buffer connected to a particular one of the egress ports, configured to buffer portions of data transmitted from the particular one of the egress ports prior to being sent to a client device.

10. The secure communication system of claim 5, further comprising an assembler module operating on a client device, configured to assemble portions of data received from the different data paths in different memory partitions of the client device based on metadata associated with each portion of data, wherein each partition of memory corresponds to a different level of security of a particular network.

11. A secure communication system for accessing separate networks, each having different security levels, on a single client workstation while maintaining complete isolation of data when communicating between the client workstation and the separate networks:
   an assignment module located at each egress point of each network, each of the assignment modules configured to divide data into portions of data, a portion of data being any quantity of bits of data, each assignment module also configured to assign a tag identifying a random traffic path the portion of data is to follow while traveling from one of the networks to the client workstation, each tag also including metadata identifying the network from which the portion of data originated as well as the end-point the portion of data is destined;
   a scrambler device connected to each egress point of the network configured to route each portion of data received from each network to a traffic path indicated by the tag assigned to the portion of data; and
   an ingress point in the client device configured to receive the portions of data via different data paths; and
   an assembler module, operating on the client device, configured to send each portion of data received by the ingress point to a logical and/or physical partition associated with one of the security levels based on the metadata identifying the network from which the portion of data originated as well as the end-point the portion of data is destined;

wherein the single client device is coupled to the secure communications system for transmitting over the plurality of separate networks;

the secure communications system coupled to the plurality of separate networks for transmitting data sent and received from the single client device over the plurality of separate networks;

each of the plurality of networks being physically partitioned from each other for security purposes;

the client device operated by an end-user having a particular security clearance level for accessing one or more of the separate networks via the client device; and the client device maintains complete isolation of data when communicating between the client workstation and the separate networks.

12. The secure communication system of claim 11, wherein the separate networks includes at least one of a JWICS (Joint Worldwide Intelligence Communications Systems) network; a SIPRNet (Secret Internet Protocol Router Network); and a NIPRNet (the Non-secure Internet Protocol Router Network).

13. The secure communication system of claim 11, wherein the assignment module includes computer executable instructions configured to operate on a gateway device.

14. The secure communication system of claim 11, wherein the scrambler device is a computing device.

15. The secure communication system of claim 11, wherein a logical and/or physical partition is a memory location of the client device.

16. A method for securely transmitting data from n separate networks, n numbering at least two, operating in parallel to at least one end-user client device through a secure communications system, comprising:

separating data into a portion of data which is Y bits in length, Y numbering at least one, wherein a portion of data is associated with data content;

assigning, at each of the n separate networks, a tag to a portion of data, the tag having a value corresponding to a data path by which a particular portion of data is to be distributed through;

assigning, at each of the n separate networks, metadata identifying the network from which the portion of data originated as well as the end-point the portion of data is destined;

transmitting the portions of data from an egress point at each of the n separate networks to a common node;

redistributing the portions of data to buffers, each buffer corresponding to the value of one of the tags, each of the buffers being at least one of logically and physically separated;

transmitting the portions of data from one or more of the buffers to queues at an ingress point of an end-user device, each queue corresponding to one of the tags; and extracting the portions of data from each queue;

assigning each portion of data to a logical partition corresponding with a level of security associated with a particular one of the networks based on the metadata identifying the network from which the portion of data originated; and reassembling each portion of data for use on the end-use device;

wherein the client device is coupled to the secure communications system for transmitting over the plurality of separate networks;

the secure communications system coupled to the n separate networks for transmitting data sent and received from the single client device over the m separate networks;

each of the n separate networks being physically partitioned from each other for security purposes;

the client device operated by an end-user having a particular security clearance level for accessing one or more of the n separate networks via the client device; and the client device maintains complete isolation of data when communicating between the client workstation and the n separate networks.

17. The method of claim 16, wherein the buffers reside on one or more server devices interposed between the end-user device and the common node.

18. The method of claim 16, wherein a portion of data includes one of a plurality of bit lengths.

19. The method of claim 16, further comprising securely transmitting data from at least one client device to one or more of the n separate networks by separating data into portions of data at the client device, assigning tags to the portions of data, each tag having a value corresponding to a data path by which a particular portion of data is to be distributed through, distributing the portions of data to the data paths based the corresponding value of the tags; collecting the portions of data after distribution through the data paths; and reassembling the portions of data prior to transmission to one or more of the n separate networks.

* * * * *